US010534774B2

(12) United States Patent
Obradovic et al.

(10) Patent No.: US 10,534,774 B2
(45) Date of Patent: Jan. 14, 2020

(54) QUERY PERFORMANCE DEGRADATION ANALYSIS TIMING

(71) Applicant: Microsoft Technology Licensing, LLC, Redmond, WA (US)

(72) Inventors: Nikola Obradovic, Belgrade (RS); Dejan Krakovic, Belgrade (RS); Vanja Vuksic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 15/629,469

(22) Filed: Jun. 21, 2017

(65) Prior Publication Data

US 2018/0373758 A1 Dec. 27, 2018

(51) Int. Cl.
*G06F 16/2453* (2019.01)
*G06F 11/34* (2006.01)
*G06F 16/21* (2019.01)

(52) U.S. Cl.
CPC .... *G06F 16/24542* (2019.01); *G06F 11/3409* (2013.01); *G06F 11/3466* (2013.01); *G06F 16/217* (2019.01)

(58) Field of Classification Search
CPC .......... G06F 11/3433; G06F 11/3414; G06F 11/3409; G06F 11/3466; G06F 16/2282; G06F 16/217; G06F 16/24542
USPC ........................................................ 707/713
See application file for complete search history.

(56) References Cited

U.S. PATENT DOCUMENTS

| 8,332,388 | B2* | 12/2012 | Chaudhuri | ........ G06F 16/24542 |
| | | | | 707/718 |
| 8,768,878 | B2* | 7/2014 | Crupi | ...................... G06F 16/21 |
| | | | | 707/602 |
| 9,356,883 | B1* | 5/2016 | Borthakur | ........... H04L 41/5025 |
| 9,734,203 | B2* | 8/2017 | Feng | ................. G06F 16/24545 |
| 2004/0167873 | A1* | 8/2004 | Dettinger | .............. G06F 16/284 |
| 2009/0077013 | A1* | 3/2009 | Hu | ..................... G06F 16/24534 |
| 2009/0164443 | A1* | 6/2009 | Ramos | .................... G06F 16/21 |

(Continued)

OTHER PUBLICATIONS

Ng, Kenneth W., et al., "Dynamic Query Re-Optimization", SSDM 1999, Cleveland, OH, Jul. 30, 1999, pp. 264-273.*

(Continued)

*Primary Examiner* — Robert Stevens
(74) *Attorney, Agent, or Firm* — Workman Nydegger (57) ABSTRACT

Mechanisms for improving resource usage of a computing system by properly balancing the timing of performance degradation analysis of an executable action set of a query based on an impact on the workload of that query. The mechanism collects workload metrics for each of multiple queries and their associated executable action sets. Performance degradation occurs when the current executed action set is no longer appropriate for the corresponding query such that more resources are used than are necessary. For each query, the system determines whether to perform degradation analysis of the current executable action set in a manner that is workload aware. That is, queries that occupy more computing resources or that impact the overall workload more will tend to have degradation analysis performed more frequently than those queries that have less impact on the overall workload. This results in improved resource usage for the workload with low overhead.

20 Claims, 4 Drawing Sheets

(56) References Cited

U.S. PATENT DOCUMENTS

| | | | |
|---|---|---|---|
| 2010/0082602 A1* | 4/2010 | Ganapathi | G06F 16/24545 707/718 |
| 2010/0198811 A1* | 8/2010 | Wiener | G06F 16/24549 707/718 |
| 2010/0235349 A1* | 9/2010 | Kuno | G06F 16/217 707/718 |
| 2010/0306188 A1* | 12/2010 | Cunningham | G06F 16/24542 707/713 |
| 2010/0312776 A1* | 12/2010 | Burrichter | G06F 16/2425 707/759 |
| 2012/0109936 A1* | 5/2012 | Zhang | G06F 11/3485 707/713 |
| 2012/0215764 A1* | 8/2012 | Barsness | G06F 16/951 707/720 |
| 2013/0185279 A1* | 7/2013 | Barsness | G06F 16/2453 707/713 |
| 2014/0214793 A1* | 7/2014 | Tatemura | G06F 16/2453 707/713 |
| 2014/0214798 A1* | 7/2014 | Nica | G06F 16/24542 707/718 |
| 2014/0310249 A1* | 10/2014 | Kowalski | G06F 11/3409 707/688 |
| 2015/0032683 A1* | 1/2015 | Talwadker | G06N 5/048 706/52 |
| 2015/0058483 A1* | 2/2015 | Mitchell | G06F 11/3495 709/224 |
| 2016/0004621 A1* | 1/2016 | Gongloor | G06F 11/3452 707/688 |
| 2016/0292225 A1* | 10/2016 | Konik | G06F 16/24542 |
| 2016/0292230 A1* | 10/2016 | Simitsis | G06F 16/24542 |

OTHER PUBLICATIONS

Markl, Volker, et al., "Robust Query Processing through Progressive Optimization", SIGMOD 2004, Paris, France, Jun. 13-18, 2004, 12 pages.*

Akdere, Mert, et al., "Learning-based Query Performance Modeling and Prediction", ICDE 2012, Washington, DC, Apr. 1-5, 2012, pp. 390-401.*

Microsoft Dictionary, 5th Edition, Microsoft Press, Redmond, WA, © 2002, pp. 446 and 501.*

Panda, Reena, et al., "Data Analytics Workloads: Characterization and Similarity Analysis", IPCCC 2014, Austin, TX, Dec. 5-7, 2014, 9 pages.*

Skarie, James, et al., "SCRAP: A Statistical Approach for Creating a Database Query Workload Based on Performance Bottlenecks", IISWC 2007, Boston, MA, Sep. 27-29, 2007, pp. 183-192.*

Laar, Enrico Van De., "The SQL Server 2016 Query Store Accessing Query Store Information using DMVs", Retrieved from: https://www.red-gate.com/simple-talk/sql/database-administration/the-sql-server-2016-query-store-accessing-query-store-information-using-dmvs/, Jan. 26, 2016, 13 Pages.

Laar, Enrico Van De., "The SQL Server 2016 Query Store Built-in Reporting", Retrieved from: https://www.red-gate.com/simple-talk/sql/database-administration/the-sql-server-2016-query-store-built-in-reporting/, Jan. 6, 2016, 14 Pages.

Laar, Enrico Van De., "The SQL Server 2016 Query Store Forcing Execution Plans using the Query Store", Retrieved from: https://www.red-gate.com/simple-talk/sql/database-administration/the-sql-server-2016-query-store-forcing-execution-plans-using-the-query-store/, Mar. 16, 2016, 9 Pages.

Laar, Enrico Van De., "The SQL Server 2016 Query Store Overview and Architecture", Retrieved from: https://www.red-gate.com/simple-talk/sql/database-administration/the-sql-server-2016-query-store-overview-and-architecture/, Nov. 16, 2015, 15 Pages.

Pollack, Ed, "The SQL Server Query Store in Action", Retrieved from: https://www.sqlshack.com/the-sql-server-query-store-in-action/, Nov. 26, 2015, 14 Pages.

* cited by examiner

QUERY PERFORMANCE DEGRADATION ANALYSIS TIMING

BACKGROUND

Computing systems and associated networks have greatly revolutionized our world. The interconnection of such computing systems into networks has resulted in explosive growth in the ability to communicate data ushering in what is now called the "information age". The explosion continues with the advent of datacenters and cloud computing environments, and other distributed environment, in which robust amounts of processing resources can be applied against massive amounts of data.

Data is often organized into data stores that can be queried against. For instance, queries may be issued against structured data (such as databases or tables), or unstructured data. The ability to query against large amounts of data allows a user to quickly gather useful information from the larger quantity of data. Examples of data stores include databases. Queriable data stores, whether a database or otherwise, allow structured queries to be interpreted by the front-end, so that the query is digested into an executable action set that is executed on the data store. The result of the execution is then collected and returned to the user.

Depending on the query, different amounts of computing resources may be expended to process the query. For instance, processing a query requires central processing unit (CPU) time, memory, storage, communication channel bandwidth and so forth. Some queries required large amounts of resources, and some require little resources, and many queries somewhere in-between.

Moreover, if a query is processed in a suboptimal way, more resources are expended as compared to if the query were processed in an optimal way. This might happen if, for instance, an executable action set is chosen based on certain assumptions. Such assumptions may be incorrect, or may be less and less correct as time goes on. For instance, the assumption may be based on statistics that grow stale or outdated with time. Sometimes, a query may be processed well previously, but as time goes on, the same query may regress in its performance metrics. Such performance degradation can adversely affect the overall workload that the query is part of. If the regression is not corrected, the regression can worsen.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to mechanisms for improving resource usage of a computing system by properly balancing the timing of performance degradation analysis for an executable action set (e.g., an execution plan in the case of a data store) of a query based on an impact on the workload of that query. The mechanism collects workload metrics for each of multiple queries and their associated executable action sets. Performance degradation occurs when the current executed action set is no longer appropriate for the corresponding query such that more resources are used when executing the query than are necessary.

For each at least one, some, most, or all of the multiple queries, the system determines whether to perform performance degradation analysis of the current executable action set in a manner that is workload aware. This means that performance degradation analysis tends to be performed more frequently for an executable action set depending on impact of the respective query on the workload. This results in a proper balance in resource usage between performing queries and performing performance degradation analysis to improve performance of queries.

In some embodiments, the determination of whether to perform degradation analysis is performed by an in-memory analysis component. The analysis component determines whether to perform degradation analysis based on a portion of the collected workload impact metrics that is also in-memory. That portion might be, for instance, a single metric that is a function of multiple performance metrics. In some cases, recency may impact the single metric such that a prior performance of the query has a decaying influence on the single metric. There may be just a single metric for each paired query and executable action set. This allows the queries to be ranked by overall impact on workload, thereby allowing more simplified analysis for determining whether to perform regression analysis.

Accordingly, the principles described herein allow for proper utilization of computing resources by balancing whether to perform regression analysis of a query or executable action set against the workload impact of that paired query and executable action set. Thus, performance of regression analysis does not itself adversely impact workload performance, but instead, results in more properly paired queries and executable action sets for especially the more impactful quires. Thus, workload performance is improved at low overhead.

This summary is provided to introduce a selection of concepts in a simplified form that are further described below in the Detailed Description. This Summary is not intended to determine the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to mechanisms for improving resource usage of a computing system by properly balancing the timing of performance degradation analysis for an executable action set (e.g., an execution plan in the case of a data store) of a query based on an impact on the workload of that query. The mechanism collects workload metrics for each of multiple queries and their associated executable action sets. Performance degradation occurs when the current executed action set is no longer appropriate for the corresponding query such that more resources are used when executing the query than are necessary.

For each at least one, some, most, or all of the multiple queries, the system determines whether to perform performance degradation analysis of the current executable action set in a manner that is workload aware. This means that performance degradation analysis tends to be performed more frequently for an executable action set depending on impact of the respective query on the workload. This results in a proper balance in resource usage between performing queries and performing performance degradation analysis to improve performance of queries.

In some embodiments, the determination of whether to perform degradation analysis is performed by an in-memory analysis component. The analysis component determines whether to perform degradation analysis based on a portion of the collected workload impact metrics that is also in-memory. That portion might be, for instance, a single metric that is a function of multiple performance metrics. In some cases, recency may impact the single metric such that a prior performance of the query has a decaying influence on the single metric. There may be just a single metric for each paired query and executable action set. This allows the queries to be ranked by overall impact on workload, thereby allowing more simplified analysis for determining whether to perform regression analysis.

Accordingly, the principles described herein allow for proper utilization of computing resources by balancing whether to perform regression analysis of a query or executable action set against the workload impact of that paired query and executable action set. Thus, performance of regression analysis does not itself adversely impact workload performance, but instead, results in more properly paired queries and executable action sets for especially the more impactful quires. Thus, workload performance is improved at low overhead.

Because the principles described herein operate in the context of a computing system, a computing system will be described with respect to FIG. 1. Then, the principles of determining when to perform query performance degradation analysis based on query performance metrics will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
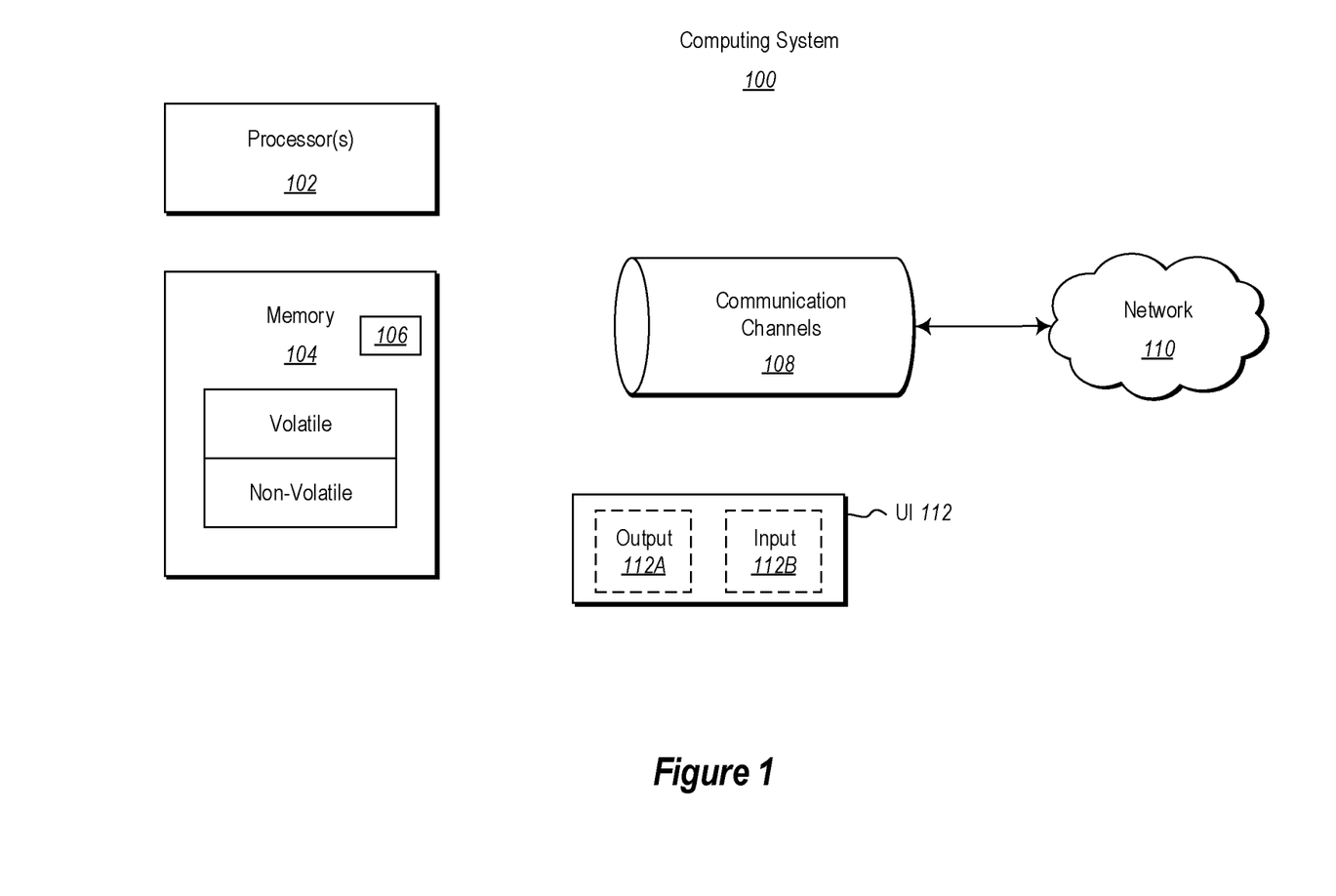
FIG. 1 illustrates an example computer system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
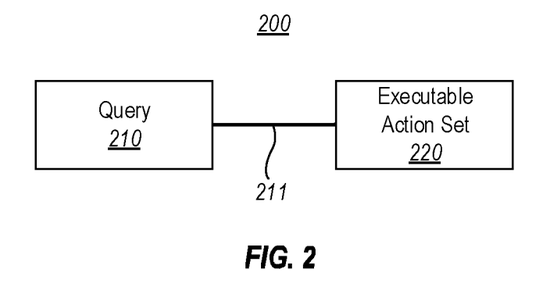
FIG. 2 illustrates a pairing of a query and an associated executable action set.

FIG. 2 illustrates a pair 200 constituting a query 210 and an executable action set 220. The query 210 represents a request for data against any store, and is processed by the front end of that data store. For instance, the data store may be a structure data store, such as a database or table, or combinations and/or multiples of the same. The data store may also be an unstructured data store, such as those that apply a schema on read of data. The data store may also be a combination of a structured data store, and an unstructured data store. As one example, the query 210 may be a query template or a query tree. Thus, a query may be the same query, possibly despite changes in parameters of those queries.

When the query 210 is processed, an associated executable action set 220 is found and executed in order to process the query. The executable action set 220 is a set of computer-interpretable actions that may be executed (along with associated dependencies and orders for execution) that define how the query is to be executed against the data store. For instance, if the query is against a database, the executable action set might be an executable plan. Regardless of the type of query, and type of data store, there is an association between the query 210 and the executable action set 220 as represented by association 211. The executable action set 220 may be originally associated with the query 210 by, for instance, a query compilation and/or optimization process in which the query 210 results in a particular executable action set 220.

Figure 3:
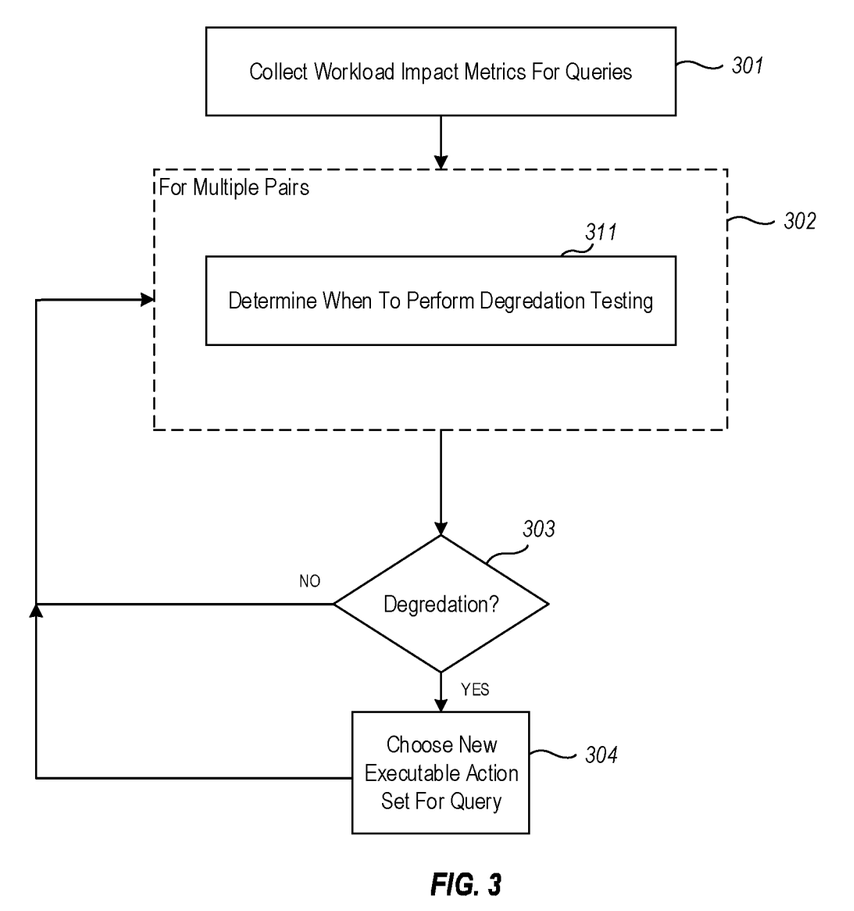
FIG. 3 illustrates a flowchart of a method for performing query performance degradation analysis in accordance with the principles described herein.

FIG. 3 illustrates a flowchart of a method 300 for performing query performance degradation analysis in accordance with the principles described herein. Much of the flow of the method 300 is, however, dedicated to determining whether or not to perform degradation analysis. Query degradation occurs when the current executed action set is no longer appropriate for the corresponding query such that more resources are used than are necessary to execute the query. For instance, the association 211 may have originally been made based on certain assumptions. Those assumptions might not be valid. Alternatively, even if the assumption was, at one point, valid, the assumption can become invalid over time. The net result is that over time, the executable action set 220 may result in regression in performance when used to execute the query 210. Such regression may increasingly impact the overall operation of the workload.

Figure 4:
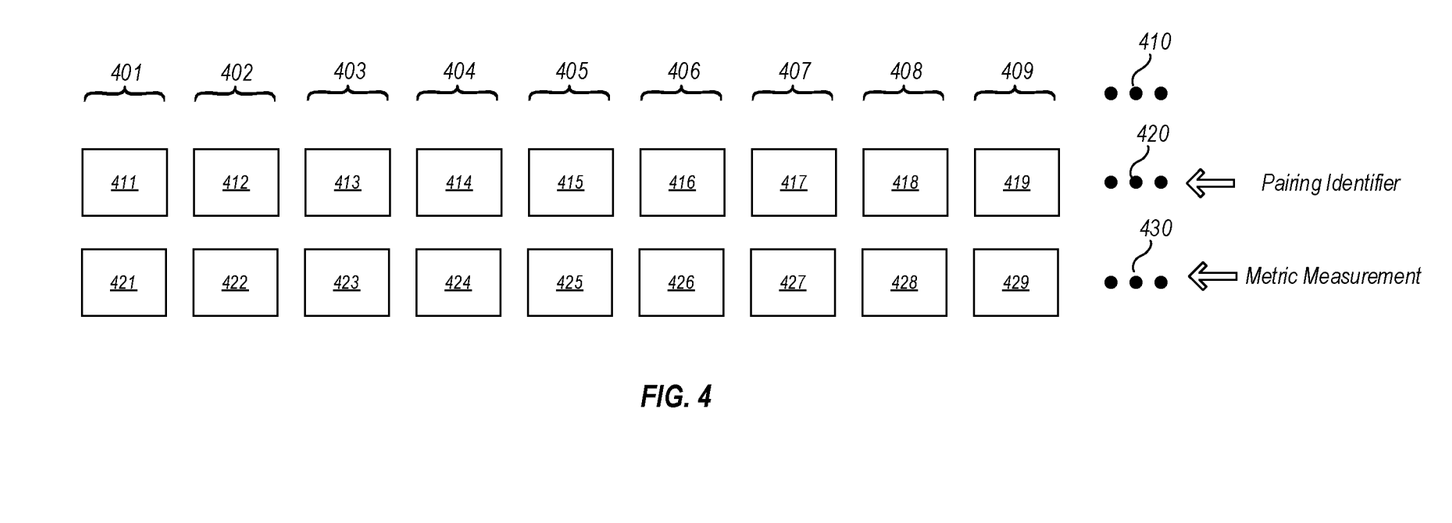
FIG. 4 illustrates an environment in which performance metrics are kept for each pairing of queries and executable action sets.

The method 300 includes collecting workload metrics for each of multiple pairs constituting a corresponding query and associated executable action set (act 301). FIG. 4 illustrates an environment 400 in which performance metrics are kept for each pairing of queries and action sets. In the environment 400, there are metrics 401 through 409, which correspond to nine different pairs of queries to action sets. Each metric 401 through 409 includes a pairing identifier 411 through 419, respectively, which identifies which pairing the metric corresponds to. Each metric 401 through 409 also includes a metric measure 421 through 429.

The ellipses 410, 420 and 430 represent that the environment 400 may include any number of metrics for any number of pairings constituting a query and associated action set. There may, for instance, be hundreds or thousands of pairings or queries and associated executable action sets. For each pair (for each query and associated action set), performance metrics are kept related to queries of that type.

When a query is executed, the query is evaluated to determine performance metrics of the query. The query metrics for that type or query are then updated. However, the principles described herein are not limited to updating the performance metrics each time a query is executed. For instance, metrics might be updated every other performance of that query, or perhaps less often, without departing from the principles described herein.

In some embodiments, the metric measurement may be a single metric that is a function of multiple performance metrics for the queries. For instance, the single metric may be a function of processing unit time, processing unit cycles, elapsed time; wait time; memory consumed; number of input/output operations, consumed channel bandwidth; and amount of parallelism. The metric measurement may take into account, two, three, four, or even all of these measurements. The metric measurement may take into consideration such parameters from more than one query of that same query type. The metric measurement may even take into consideration a time-wise decay of previously encountered queries.

Figure 5:
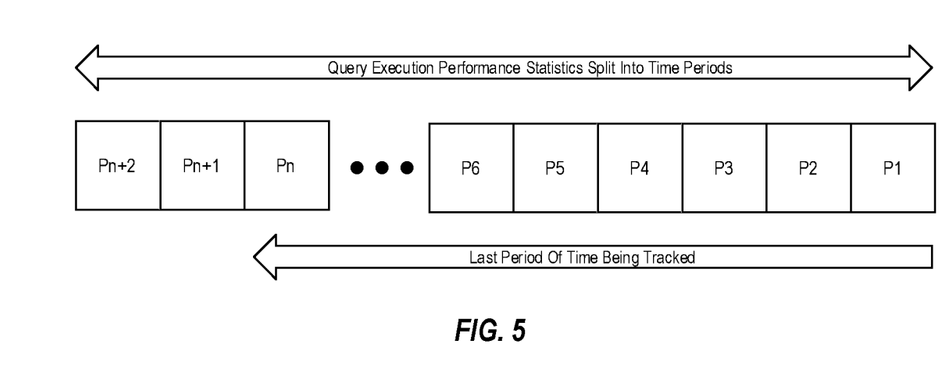
FIG. 5 illustrates that the query performance metrics may be split into periods of time labelled $P_1$ to $P_N$, where "N" is any whole number two or greater.

For instance, FIG. 5 illustrates that the query performance metrics may be split into periods of time labelled $P_1$ to $P_N$, where "N" is any whole number two or greater. In FIG. 5, the past N+2 periods are illustrated. However, only metrics for the past N time intervals are tracked in this embodiment. As time passes, the relevance of a prior performance of a query is discounted by applying a discount factor to all queries in a respective prior interval. The prior N intervals thus becomes a rolling window. As time goes by, the older intervals outside of the rolling window are replaced by the new, most recent ones. Also, the discount factors are updated accordingly and the single metric is recalculated for the query.

Returning to FIG. 3, the description now continues with the method 300 for performing query performance degradation analysis in accordance with the principles described herein. For each of at least one, some, most, or potentially even all of the pairings of queries and executable action sets, the content of box 302 is performed. Specifically, the computing system determines whether to perform performance degradation analysis of the current executable action set (act 311) of the query in a manner that is workload aware. In other words, the computing system determines the timing query performance degradation analysis such that the degradation analysis is performed at a more urgent timing if the query has more impactful collected workload impact metrics. As an example, the computing system that performs the method 300 may be the computing system 100 of FIG. 1.

In one embodiment, the timing of degradation analysis is determined based on a single performance metric such as that described above with respect to FIG. 4. For instance, the timing of degradation analysis on the pairing identified by pairing identifier 411 is determined at least in part by the measurement metric 421. Likewise, the timing of regression analysis on the pairing identified by pairing identifier 419 is determined at least in part by the measurement metric 429. The same may be said for the timing of regression analysis on the pairings identified by pairing identifiers 412 through 418, and the respective measure metrics 422 through 428.

When determining whether to now perform degradation analysis on the current executable action set of a query, the last time that a degradation analysis was performed on the pairing may be considered to determine whether degradation analysis for that pairing is due to be completed. In some embodiments, the determination of whether to perform a degradation analysis of a query (act 302) for a query is performed every time that query is received.

If it is determined that a degradation analysis for a paired query and executable action set is to be performed, then a degradation analysis is performed to determine whether a significant performance degradation of the query has occurred (decision block 303). If the degradation analysis does not result in a determination that significant degradation has occurred ("No" in decision block 303), then the method 300 again returns to act 302, but without repairing occurring for now. If the degradation analysis does result in a determination that significant regression has occurred ("Yes" in decision block 303), the degradation analysis results in a new pairing of a different executable action set with the query (act 304), and the method 300 returns to act 302 for further determination as to whether another degradation analysis is to occur on this or other pairing (act 302).

In choosing another executable action set for a particular query, the executable action set is checked for degradation compared to any other executable action sets that were chosen for this query in previous executions of that query. If no such other executable action sets exist, then the executable action set is not considered as having experienced a degradation ("No" in decision block 303). In case an executable action set degradation is detected by this check ("Yes" in decision block 303), the previous better executable action set is enforced and consequently chosen in subsequent executions of that query.

In some embodiments, the timing of the workload-aware degradation analysis being performed for the query is based on a ranking of the query amongst other queries when ranked with the collective performance metrics. As an example referring back to FIG. 4, suppose that the metric measures 421 through 429 are each a reduced to a single metric. In that case, the measures 421 may be sorted by that single metric. In that case, the timing may additionally be based on that ranking. For instance, the timing at which degradation analysis is performed on the respective queries identified by pairing identifiers 411 through 419 may each be based upon their metric measures 421 through 429. Thus, the query of with pairing identifier 421 has degradation analysis performed more frequently than the query of with pairing identifier 422, and so forth, down to pairing identifier 429.

Figure 6:
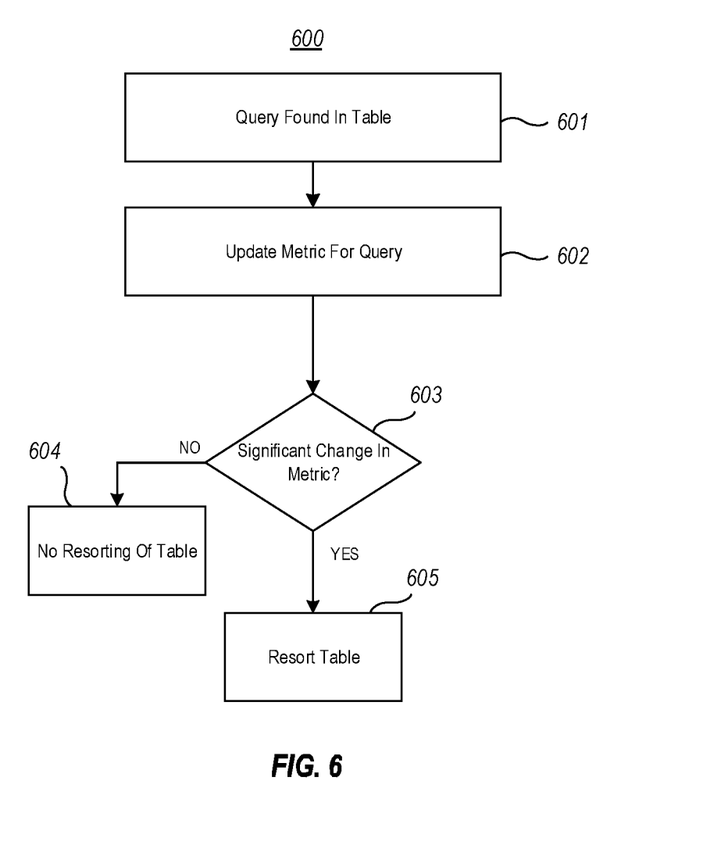
FIG. 6 illustrates a flowchart of a method for updating and potentially resorting the performance metrics.

As an example, the environment 400 in which the performance metrics are kept may be a table that is generally sorted by performance metric 421 through 429, in which case, ranking is generally based on placement of a row for that query within the table. If there are numerous pairings, the size of the table may be quite large. Sorting such a large table frequently may result in too many resources being consumed by resorting the table. FIG. 6 illustrates a flowchart of a method 600 for updating and potentially resorting the performance metrics.

Upon a query being completed, the query is found in the table (act 601). Then the performance metric for that query is updated (act 602). It is then determined whether or not a significant change in the performance metric (decision block 603). If not ("No" in decision block 603), the table is not resorted (act 604) prior to a decision being made on whether to perform degradation analysis on that query. If there is a significant change in the performance metric ("Yes" in decision block 603), then resorting is performed (act 605), and an analysis of degradation testing is performed based on that resorted table.

In some embodiments, the determination of whether to perform degradation analysis is performed by an in-memory degradation analysis component using at least a portion of the collected workload impact metrics that is also in-memory. For instance, that portion may be the performance metric that is calculated for each pairing. In other words, the environment 400 in which the performance metrics are kept may be in-memory. This may be especially possible where the performance metrics are kept in a table as a single value, with one row for each pairing.

By keeping the decision on whether to perform degradation testing within memory, the determination as to whether to perform degradation testing may be performed quickly without the need to access disk. On the other hand, when degradation testing is performed, further information may be accessed on disk, which should not impact overall workload performance very much since degradation only needs to be performed sometimes and at an appropriate timing.

Thus, an effectively mechanism has been described for efficiently deciding when to evaluate a query executable action set for a performance regression, based on the resources used and impact the query has on the overall workload, adapting over time. If the query uses more resources, its relative importance within the workload increases, and hence its executable action sets are evaluated for regressions more frequently. Also, the relative performance overhead of doing regression evaluation for such query is much lower.

Over time, the costs of the queries based on the metrics change, and the determination for each query is updated accordingly. In some embodiments, all the performance metrics are cached in memory with a small memory overhead, and there is no access to disk before a decision is made to evaluate an executable action set for regression, at which point the resource consumption to perform the evaluation is justified.

Using the principles described herein, the user can fully rely on the performance degradation logic to efficiently detect and correct the relevant execution action set regressions in their workload. It provides users with insurance and gives them more confidence in changing their workload or upgrading database data store to a newer version without degradation evaluations negatively impacting the performance and resource consumption of their workload.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are structured such that, when executed by the one or more processors, cause the computing system to perform a method for evaluating whether query performance degradation analysis is to be performed, the method comprising:

collecting workload metrics for each of multiple pairs constituting a respective query and executable action plan that directs how the query is to be executed; and for each at least one of the multiple pairs, using the collected workload metrics to determine when to perform query performance degradation analysis of a paired query and executable action plan, the using the collected workload metrics comprising:

ranking the collected workload metrics based on an impact on workload; and causing the performance degradation analysis of a higher-ranked pair to be performed more frequently than that of a lower-ranked pair, so that the timing of the performance degradation analysis is dependent on the collected workload metrics.

2. The computing system in accordance with claim 1, the determination of when to perform query performance degradation analysis being performed by an in-memory analysis component.

3. The computing system in accordance with claim 2, the analysis component performing the determination of whether to perform query performance degradation analysis using at least a portion of the collected workload metrics that is also in-memory.

4. The computing system in accordance with claim 3, the portion of the collected workload metrics that is in-memory comprising a single metric that is a function of multiple performance metrics.

5. The computing system in accordance with claim 1, the method further comprising:

performing the query performance degradation analysis for a paired query and executable action plan if it has been determined to then perform the query performance degradation analysis.

6. The computing system in accordance with claim 5, the query performance degradation analysis resulting in a pairing of a different executable action plan with the query.

7. The computing system in accordance with claim 5, the query performance degradation analysis not resulting in a pairing of a different executable action plan with the query.

8. The computing system in accordance with claim 1, the timing of the query performance degradation analysis being performed for the query based on a ranking of the query when ranked with the collected performance metrics.

9. The computing system in accordance with claim 1, the query performance degradation analysis being performed for each at least some of the multiple pairs.

10. The computing system in accordance with claim 1, the query performance degradation analysis being performed for each of at least most of the multiple pairs.

11. The computing system in accordance with claim 1, the multiple pairs constituting queries against a database.

12. The computing system in accordance with claim 1, the collected workload metrics being updated for a particular pair of a query and an executable action plan each time the query and executable action plan are executed.

13. The computing system in accordance with claim 1, the determining when to perform query performance degradation analysis of a paired query and executable action plan being performed each time the query is received.

14. The computing system in accordance with claim 1, the multiple pairs of queries and executable action plans each being against a relational database.

15. The computing system in accordance with claim 1, the workload metrics for at least one executable action pair comprising a single metric that is a function of multiple performance metrics.

16. The computing system in accordance with claim 15, a weighting of the performance metrics of prior executions of that same query and executable action plan decaying over time in influence on the single metric.

17. The computing system in accordance with claim 15, the multiple performance metrics comprising at least two of the following:

processing unit time;

processing unit cycles;

elapsed time;

wait time;

memory consumed;

number of input/output operations;

consumed channel bandwidth; and amount of parallelism.

18. The computing system in accordance with claim 15, the multiple performance metrics comprising at least four of the following:

processing unit time;

processing unit cycles;

elapsed time;

wait time;

memory consumed;

number of input/output operations;

consumed channel bandwidth; and amount of parallelism.

19. A method for evaluating whether query regression analysis is to be performed, the method comprising:

collecting workload metrics for each of multiple pairs constituting a corresponding respective query and executable action plan that directs how the query is to be executed; and for each at least one of the multiple pairs, using the collected workload metrics to determine when to perform query performance degradation analysis of a paired query and executable action plan, the using the collected workload metrics comprising:

ranking the collected workload metrics based on an impact on workload; and causing the performance degradation analysis of a higher-ranked pair to be performed more frequently than that of a lower-ranked pair, so that the timing of the performance degradation analysis is dependent on the collected workload metrics.

20. A method for evaluating whether query regression analysis is to be performed, the method comprising:

collecting workload metrics for each of multiple pairs constituting a corresponding respective data request type and executable action set that directs how the data request type is to be executed against data; and for each at least one of the multiple pairs, using the collected workload metrics to determine when to perform request performance degradation analysis of a paired data request type and executable action set, the using the collected workload metrics comprising:

ranking the collected workload metrics based on an impact on workload; and causing the performance degradation analysis of a higher-ranked pair to be performed more frequently than that of a lower-ranked pair, so that the timing of the performance degradation analysis is dependent on the collected workload metrics.

* * * * *